(No Model.)

P. LEUBA.
SEXTANT.

No. 310,692. Patented Jan. 13, 1885.

WITNESSES:
C. Neveux
L. Sedgwick

INVENTOR:
P. Leuba
BY Munn & Co
ATTORNEYS.

UNITED STATES PATENT OFFICE.

PHILIPPE LEUBA, OF BEAVER, UTAH TERRITORY.

SEXTANT.

SPECIFICATION forming part of Letters Patent No. 310,692, dated January 13, 1885.

Application filed August 2, 1882. Renewed August 28, 1884. (No model.)

*To all whom it may concern:*

Be it known that I, PHILIPPE LEUBA, of Beaver city, in the county of Beaver and Territory of Utah, have invented certain new and useful Improvements in Sextants, of which the following is a full, clear, and exact description.

This invention consists in a novel construction of sextants in which there are two artificial horizons, one for taking elevations and the other for taking depressions, and in which provision is made for use of the sextant in the dark or at night.

Reference is to be had to the accompanying drawings, forming part of this specification, in which similar letters of reference indicate corresponding parts in all the figures.

Figure 1:
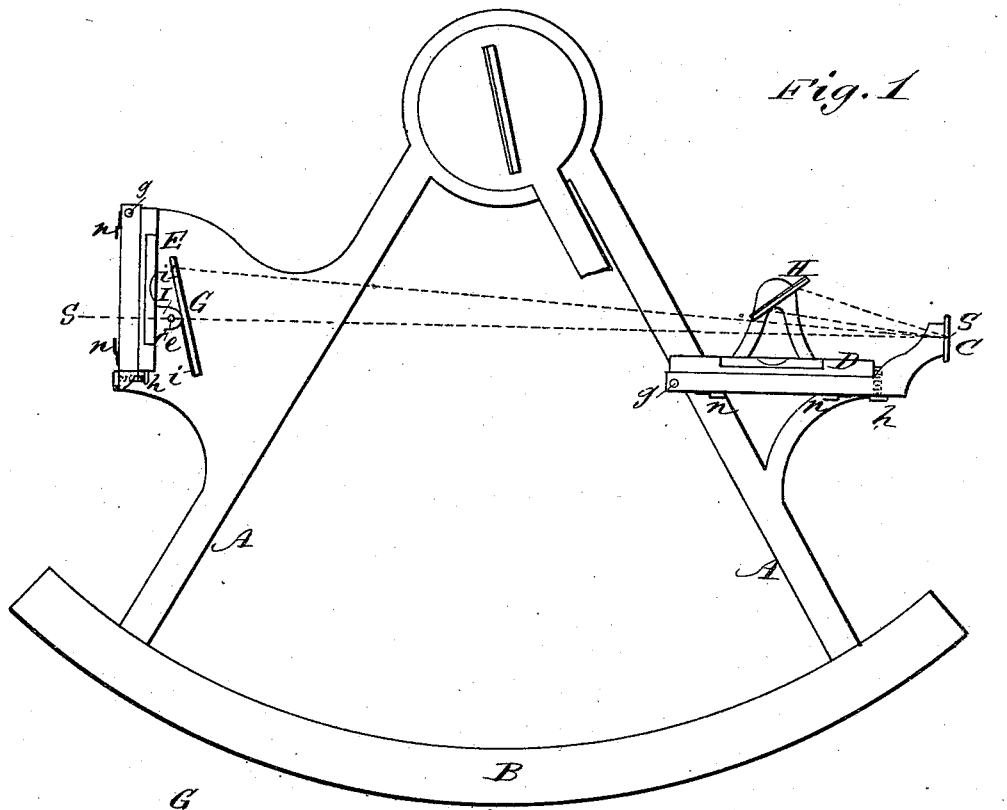
Figure 2:
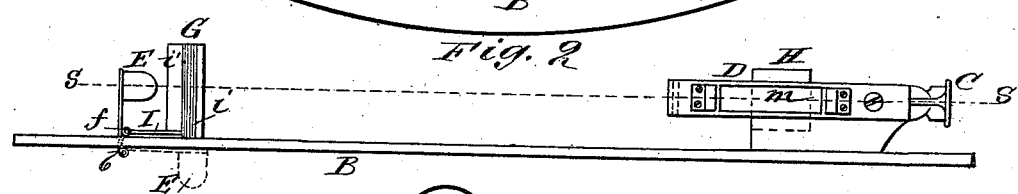
Figure 3:
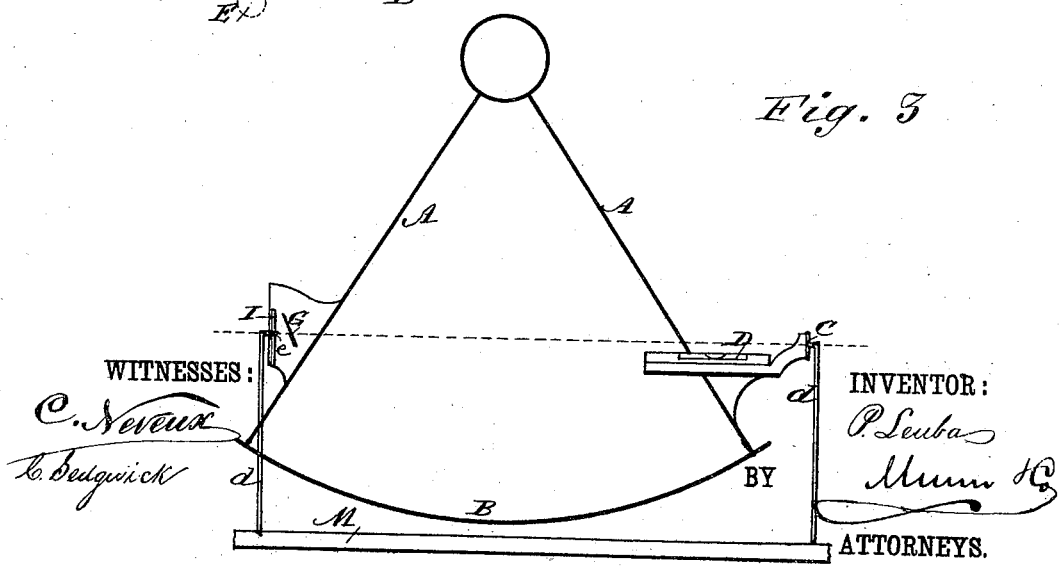

Figure 1 represents a side view of a sextant having my improvements applied, and Fig. 2 a bottom edge view of the same. Fig. 3 is a diagram in illustration of the adjustment of one of the levels of the instrument, to make the line of collimation horizontal.

A is the frame of the sextant, and B the arc, which should be graduated, as usual. C is the eye-piece; D E, fluid-levels attached to the frame, so as to occupy positions at right angles with each other; G, the horizon-glass, and H a reflector. The level E is hinged, as at $b$, to admit of its adjustment either behind the horizon-glass G, as shown in full lines in Figs. 1 and 2, or behind its support, as shown in dotted lines in Fig. 2—that is to say, said level E is hinged to the frame A of the sextant in such manner that it may be folded back flat against the side of the frame when not required for use. When in use its position is such as indicated in full lines, Figs. 1 and 2, so that it is in the proper relation with level D.

When the instrument is in use for taking elevations, the level E is folded behind its support, the instrument is held vertically, and sight taken through the eye-piece C, to see in the reflector H the air-bubble of the level D come to its level-mark, and to observe at the same time the reflected image upon the horizon-glass G of the point observed. The reading upon the arc B then gives the angular distance of the point observed above the horizon-line.

To adjust the level D and cause the line of collimation, as required, to put the instrument in condition for accurate work to be horizontal, I erect upon any suitable firm surface or support—such, for example, as a solid table or block, M, as shown in Fig. 3—two wires, $d\ d$, having their upper ends bent at right angles toward each other. The bent end of one of said wires is inserted in the hole of the eye-piece C, and the bent end of the other of the said wires is inserted in a hole, $e$, of an adjusting-piece, I, when the same, which is pivoted at $f$, is raised or swung into position for the purpose. The instrument is then held with its plane in a vertical position, and the level D adjusted by means of its hinged connection $g$ and adjusting-screw $h$.

To measure angles of depression, the level E is turned behind the horizon-glass G, as shown in full lines in Figs. 1 and 2. It is placed so that its air-bubble when at the level-point appears in full behind the transparent half or portion $i$ of the horizon-glass G as viewed through the eye-piece C. Having thus adjusted the instrument to use it for measuring angles of depression, it is held so that its line of collimation S S will be vertical, the eye-piece C being uppermost and the horizon-glass G beneath. Sight is then taken down through the eye-piece to observe the air-bubble of the level E, behind the horizon-glass, and when it is at its level the reflection is noticed in the silvered portion $i$ of the horizon-glass of the point observed. The reading upon the arc B is the angle of depression which the observed point makes with the horizon-line.

To adjust the level E, and to make the line of collimation S S truly vertical, the instrument is first set by its handle (which is not here shown) as nearly vertical as possible. I then place under it a saucer or other suitable vessel containing mercury, molasses, water, or other suitable substance, and stretch a string across the edges of said vessel, and look through the eye-piece C in line or range with the edge of the silvered portion $i$ of the horizon-glass G to the string, after which I move the vessel (this being more convenient than to move the sextant, which is held fixed in position) till the string covers its image in the substance contained within the saucer. The instrument is then firmly secured, and the level E adjusted so that its air-bubble comes to its level, when the line of collimation S S will be truly vertical. To provide for such adjustment of the level E, it is pivoted, as at $g$, and fitted with an adjusting-screw, $h$, as in the case of the level D.

To use the instrument at night-time or in dark places, both levels D E are uncovered or made open on their under sides, as shown at $m$ for the level D in Fig. 2. Said under sides or backs of the levels are also provided with slideways $n$ $n$, designed to hold a plate which is covered with luminous paint, and which will enable the observer to see the air-bubble of the level and measure the angular distance of a star or light from the horizon-line.

By the use of this my improved sextant an observer can always have a horizon-line at his command, even in mountainous countries, without having to carry with him a vessel and liquid for an artificial horizon, and of setting the same up and of carefully removing it when changing the point of observation. The horizon-line is always at hand whether the observer is on horseback, in a carriage, or in a boat on lakes and rivers. Moving away a few feet to obtain a better point of observation does not necessitate the moving of a liquid horizon every time a change of place is desired, thus saving much time and trouble.

Having thus fully described my invention, I claim as new and desire to secure by Letters Patent—

1. A sextant having duplicate attached fluid-levels D E, arranged in relation with each other, as described, in combination with the horizon-glass G, the reflector H, and the eye-piece C, substantially as specified.

2. The combination of the hinged adjusting-piece I, with the fluid-level D, the horizon-glass G, the reflector H, and the eye-piece C, essentially as specified.

3. A sextant having one or more attached fluid-levels made open at their backs, and constructed to receive within such opening a plate having a luminous surface, substantially as and for the purpose herein described.

PHILIPPE LEUBA.

Witnesses:
F. R. CLAYTON,
D. LANG.